W. STEGER.
WEATHER STRIP.
APPLICATION FILED NOV. 3, 1908.
937,193.
Patented Oct. 19, 1909.
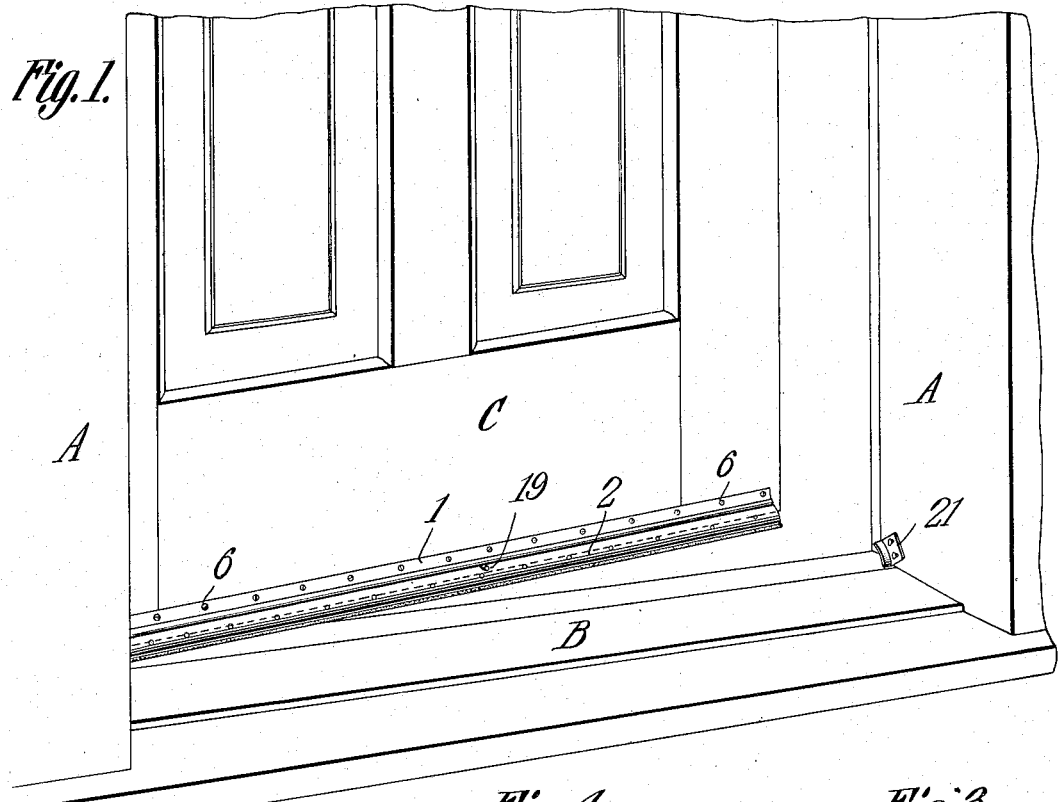
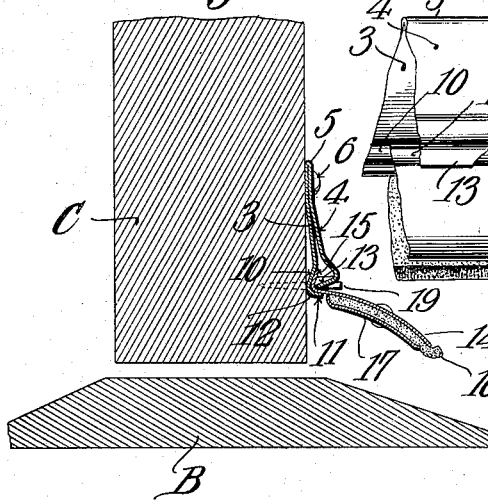
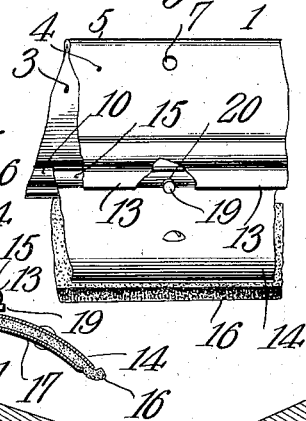
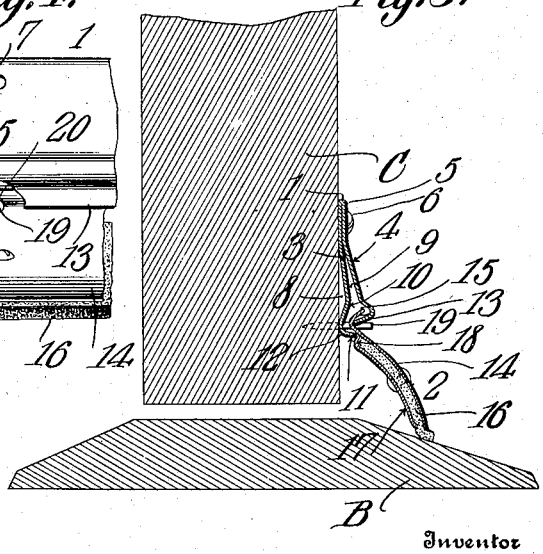
Witnesses
Inventor
William Steger.
By C. A. Snow & Co.
Attorneys

UNITED STATES PATENT OFFICE.

WILLIAM STEGER, OF LINDEN HEIGHTS, OHIO.

WEATHER-STRIP.

937,193.
Specification of Letters Patent.
Patented Oct. 19, 1909.

Application filed November 3, 1908. Serial No. 460,899.

*To all whom it may concern:*

Be it known that I, WILLIAM STEGER, a citizen of the United States, residing at Linden Heights, in the county of Franklin and State of Ohio, have invented a new and useful Weather-Strip, of which the following is a specification.

This invention relates to weather strips, and has for its object to provide a movable weather strip for use primarily on the bottom of a door, a hinged window, or like structure and which shall be easy to construct and apply, and one that is efficient and durable.

With this and other objects in view the invention consists of the novel construction, combination and arrangement of parts hereinafter described and claimed, and illustrated in the accompanying drawing forming a part of this specification in which:—

Figure 1 is a perspective view of a part of a door frame and the door partly open with the improved weather strip applied on the bottom of the door; Figs. 2 and 3 cross sections through the bottom of a door and its sill piece showing the weather strip in place and in two positions respectively; and Fig. 4 a front view of a small portion of the weather strip showing the means for locking it against endwise movement.

Similar reference characters are used for the same parts in all the figures.

In the drawing, A indicates the door frame, B the sill or threshold and C the door shown partly open in Fig. 1.

Adapted to be fastened to the bottom of the door near its lower edge and parallel thereto is a sheet metal support 1 for the swinging weather strip 2 attached to the support by a spring actuated hinge which normally holds the weather strip in raised position free of the sill or threshold B. The support 1 is preferably made of a strip of thin spring sheet metal as long as the width of the door opening and doubled upon itself from end to end as shown to form two strips 3 and 4 which are in contact at the folded edge 5 where screws 6 pass through the apertures 7 and secure the support on the door. The strips 3 and 4 curve or incline away from the door and from each other and form a space 8 between the door C and the strip 2, and a space 9 between the two strips. Near the lower edge of the strip 3, the latter is bent inwardly to form a flat part 10 at a different angle to the strip itself the extreme edge 11 being then turned outwardly at a right angle to the flat part 10. The corner or angle 12 thus formed, rests against the face of the door C. The strip 4 is bent outwardly and then inwardly at its lower edge to form a straight flange 13, about perpendicular to said strip, and so shaped that when the swinging weather strip is removed, the flange will rest within the angle 12 on the strip 3, because the tendency of the two strips 3 and 4 is to spring together.

The weather strip proper 2 comprises an outer plate 14 as long as the support 1 and as wide as necessary for the purpose, curved slightly outward from the lower edge to near the upper edge which latter is bent outwardly to form a flange 15. A strip of felt, asbestos, or other suitable material 16 extends from end to end of the plate 14 and projects a short distance beyond its lower edge. The felt is retained in place by an under strip 17 of metal held in place by screws or rivets passing through the plate 14. The upper end of the retaining strip 17 is bent at a right angle to form a flange 18 against which the upper edge of the felt 16 or other material abuts. As shown in Fig. 3 the under strip 17 serves, in its flange 18, to prevent, by contact with the lower edge of the member 3, the weather-strip proper from being pushed upward between the members 3 and 4 when the weather-strip comes in contact with the threshold.

The parts are assembled by first screwing the support 1 on the door near the bottom thereof and parallel to its lower edge. The strips 3 and 4 are separated slightly at their outer ends so that the inner end of the weather strip 2 may be inserted therein in such manner that the angle formed by the curved plate 14 and its flange 15 rests in the angle 12 on the strip 3. The flange 13 on the outer strip 4 engages the interior angle on the plate 14 formed by the flange 15 with a spring pressure. As soon as the weather strip has been placed in the end of the support, it is pushed endwise until it reaches its proper position and there held from endwise movement by a pin 19 seated in coincident openings 20 in the lower end of the strip 3 and the upper end of the weather strip plate 14.

The weather strip 2 is held normally elevated by means of the spring pressure of the strip 4 acting above the pivotal point of the weather strip which point is formed by the lower edge 11 of the strip 3 engaging the corner where the flange 18 on the strip 17 abuts against the under side of the plate 14. When the door is closed the outer end of the hinged weather strip strikes an inclined abutment 21, adjustably screwed to the door frame in position to be struck by the weather strip as the door is shut. The position and inclination of said abutment are such that the weather strip will be swung downwardly and into close contact with the sill or threshold B.

The contact of the flange 13 with the angular upper end of the weather strip is very close and absolutely prevents the entrance of snow, rain, or dust below the door.

What is claimed is:—

1. In a device of the class described, a fixed member comprising an inner strip and a resilient outer strip, the said strips being bent at their edges to form overlapping flanges; an outer plate pivotally mounted between the strips and being fulcrumed intermediate its edges upon the flange of the inner strip, the outer strip being arranged to engage the outer plate in lifting relation, the outer plate being overbent to form a flange to engage the flange of the outer strip, and another flange of the outer plate being arranged to engage the inner strip to limit the lifting of the outer plate.

2. In a device of the class described, a fixed member comprising an inner strip and a resilient outer strip, the said strips being bent at their edges to form overlapping flanges; and an outer plate pivotally mounted between the strips and being fulcrumed intermediate its edges upon the flange of the inner strip, the outer strip being arranged to engage the outer plate in lifting relation, the outer plate being overbent to form a flange to engage the flange of the outer strip; an under strip mounted upon the outer plate and arranged to engage the flange of the inner strip to limit the upward movement of the outer plate between the inner and the outer strips.

3. In a device of the class described, a fixed member comprising an inner strip and a resilient outer strip, the said strips being bent at their edges to form overlapping flanges; and an outer plate pivotally mounted between the strips and being fulcrumed intermediate its edges upon the flange of the inner strip, the outer strip being arranged to engage the outer plate in lifting relation, the outer plate being overbent to form a flange to engage the flange of the outer strip; an under strip mounted upon the outer plate and arranged to engage the flange of the inner strip to limit the upward movement of the outer plate between the inner and the outer strips; and a flexible packing element mounted between the under strip and the outer plate and arranged to extend beyond the edges of the under strip and the outer plate.

In testimony that I claim the foregoing as my own, I have hereto affixed my signature in the presence of two witnesses.

WILLIAM STEGER.

Witnesses:
 FRANCES L. EKELBERRY,
 LEO FRITTER.